June 13, 1939.　　　　H. BROOKS　　　　2,162,475
POWER CAPACITOR
Filed Jan. 29, 1938

WITNESSES:
C. J. Weller
F. P. Lyle

INVENTOR
Hamilton Brooks.
BY O. B. Buchanan
ATTORNEY

Patented June 13, 1939

2,162,475

UNITED STATES PATENT OFFICE 2,162,475

POWER CAPACITOR

Hamilton Brooks, Wilkinsburg, Pa., assignor to Westinghouse Electric & Manufacturing Company, East Pittsburgh, Pa., a corporation of Pennsylvania Application January 29, 1938, Serial No. 187,714

8 Claims. (Cl. 175—41)

The present invention relates to capacitors, and more particularly, to high voltage power capacitor assemblies.

Capacitors of the type which this invention concerns are often used on high voltage transmission or distribution lines for power-factor correction, or other purposes. In such capacitors, the capacitor sections or elements themselves must be properly insulated from the container or case, which is usually of metal, so as to withstand high voltages to ground, and they must also have sufficient mechanical support to hold them fixed in position in the case and under compression, and to prevent disturbance by mechanical shocks and stresses. Provision must also be made for heat flow from the capacitor sections to the case so that the heat generated in them may be readily dissipated.

In most instances, the capacitor sections are clamped together, usually by metal clamping members, and the assembly thus formed is held in position in the case by supporting members of various types. Insulation, of course, is also provided to properly insulate the capacitor sections from the clamping members and from the case. The case is filled with oil or other insulating compound which occupies the vacant spaces and, by circulating around the capacitor sections, assists in conveying the heat from them to the walls of the case where it may be dissipated. This construction obviously requires a number of clamping, insulating and supporting members which make it large and relatively complicated and increase the cost of the assembly.

The object of the present invention is to provide a high voltage power capacitor which will meet the above-mentioned requirements of insulation and mechanical support, but which will make it possible to materially reduce the size of the assembly and also to keep the labor and material costs low.

A further object of the invention is to provide a simplified capacitor assembly which will result in improved heat flow from the capacitor sections to the case.

These objects are attained by providing a single rigid member of insulating material which fits closely into the case and in which the capacitor sections are clamped. This member serves the double purpose of insulating the sections from the case and of providing mechanical support for them. Suitable spaces are provided for circulation of a liquid dielectric in the case to insure proper dissipation of heat.

The invention will be more fully understood from the following detailed description taken in connection with the accompanying drawing, in which.

The capacitor of the present invention comprises a case or container 1 which is preferably, although not necessarily, made of metal and in which the capacitor assembly proper is contained. A suitable cover 2 is provided for the case and sealed thereto. The capacitor assembly itself consists of a channel-shaped member 3 of heavy press board, or other insulating material having the necessary rigidity and mechanical strength. The capacitor sections 4 are contained within this channel member and may be of any suitable or usual construction, preferably being formed of alternate layers of paper and metal foil wrapped together and compressed into flat capacitor sections or units.

Figure 2:
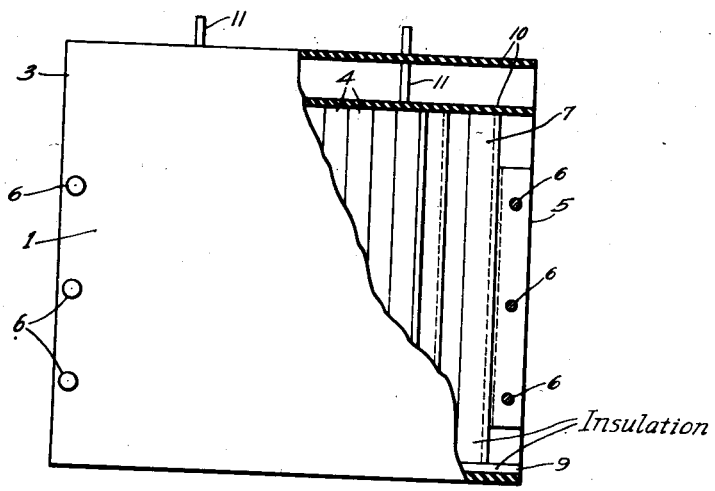
Fig. 2 is a view in side elevation of the capacitor assembly partially broken away, the case being omitted.
Figure 3:
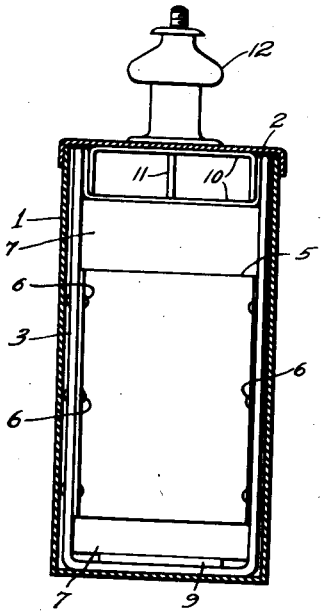
Fig. 3 is a view in end elevation of the capacitor.

Any desired number of these sections may be used, depending on the rating of the capacitor, and they are placed within the channel member and held in place under pressure by metal clamping plates 5 at either end. These plates are in the form of channel members and are secured in the ends of the channel 3 by means of rivets 6 which hold the clamping plates in position, so that the capacitor sections are maintained under pressure. Insulating spacers 7 are provided at each end of the assembly to insulate the capacitor sections from the metal clamping plates and the plates themselves are made considerably shorter than the capacitor sections, so that their top and bottom edges are spaced a substantial distance from the ends of the sections, thus providing a long creepage path, as may be clearly seen from Fig. 2. If desirable or necessary, other insulating spacers 8 may be provided between capacitor sections or groups of sections.

Figure 1:
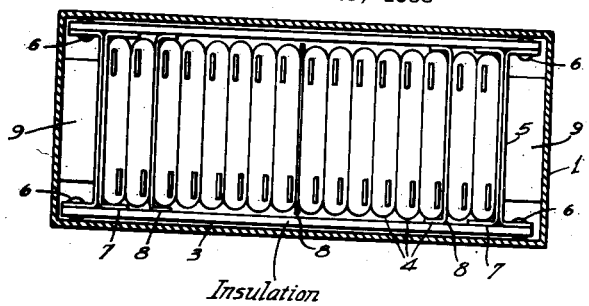
Figure 1 is a plan view of a capacitor with the case shown in section.

The case is filled with a suitable liquid dielectric such as oil or other insulating compound, and in order to provide for its free circulation and, therefore, for more effective removal of heat from the capacitor sections, a spacing member 9 of insulating material, such as press board, is provided in the bottom of the channel 3 to space the capacitor sections a small distance from the bottom. It will be seen from Fig. 1 that the length of the capacitor sections is slightly less than the width of the channel 3, so that a small space is provided on each side, and also that the rivets 6 serve to hold the channel member 3 a small distance from the side walls of the case 1. These spaces permit the insulating compound to circulate freely on all sides of the capacitor sections within the channel member and also permit it to flow between the channel member and the walls of the case so that the heat which flows from the capacitor sections to the insulating compound will be effectively transferred to the metal case where it is readily dissipated into the surrounding air. Since the circulation spaces are quite small, only a small amount of insulating compound will be required to fill the case and this is an important advantage because of the relatively high cost of such compounds.

If desired, press board channel members 10 may be fitted into the top of the channel 3 in order to close it. The capacitor sections are connected to leads 11 which pass through the channel members 10 and are brought through the top of the case and connected to terminals 12 of any desired or suitable type.

It will be seen, therefore, that a very much simplified capacitor assembly has been provided in which a single member serves both as insulation and as a support for the capacitor sections, and in which provision is made for free circulation of insulating compound in order to obtain a more effective dissipation of heat. As a result of these novel features, the size of the assembly can be kept small and the material and labor costs are considerably reduced.

Although a specific embodiment of the invention has been illustrated and described, it is to be understood that it is not limited to the exact details of construction shown, but that in its broadest aspect, it includes all other modifications and embodiments which fall within the scope of the appended claims.

I claim as my invention:

1. A power capacitor comprising a case containing a liquid dielectric, a plurality of capacitor sections, a single rigid member of insulating material fitting closely in the case for holding said capacitor sections in position and insulating them from the case, and means for securing the capacitor sections in said member.

2. A power capacitor comprising a case containing a liquid dielectric, a rigid, generally channel-shaped member of insulating material fitting closely in the case, a plurality of capacitor sections within said member and means for clamping them tightly therein.

3. A power capacitor comprising a case containing a liquid dielectric, a rigid generally channel-shaped member of insulating material fitting into the case and spaced a small distance from the side walls thereof to provide for circulation of the dielectric, a plurality of capacitor sections within said member, and means for clamping them in place therein.

4. A power capacitor comprising a case containing a liquid dielectric, a rigid generally channel-shaped member of insulating material fitting into the case and spaced a small distance from the side walls thereof to provide for circulation of the dielectric, a plurality of capacitor sections within said member, and a clamping plate at each end thereof to clamp the capacitor sections tightly in place.

5. A capacitor assembly comprising a case, a rigid member of insulating material fitting into the case and extending substantially coextensive with two opposite sides and the bottom of the case, a plurality of capacitor sections within said member, means for clamping them therein and an insulating compound filling the case.

6. A capacitor assembly comprising a case, a rigid member of insulating material fitting into the case and extending substantially coextensive with two opposite sides and the bottom of the case, a plurality of capacitor sections within said member, the capacitor sections being spaced a small distance from the sides and bottom of said member, means at each end thereof for clamping the capacitor sections therein, and a liquid insulating compound filling the case.

7. A capacitor comprising a case containing a liquid insulating compound, a rigid, generally channel-shaped member of insulating material fitting closely in the case, a plurality of capacitor sections within said member, metal clamping members secured in the open ends of the channel-shaped member to hold the capacitor sections under pressure therein, and an insulating member between each clamping member and the adjacent capacitor section.

8. A capacitor comprising a case containing a liquid insulating compound, a rigid, generally channel-shaped member of insulating material fitting in the case and spaced a small distance from the side walls thereof to permit circulation of the insulating compound, a plurality of capacitor sections within said member, said capacitor sections being spaced a small distance from the sides and bottom of the member to permit circulation of the insulating compound around them, a metal clamping plate secured in each end of the channel-shaped members to hold the capacitor sections under pressure therein, the lower edges of the plates being spaced from the bottom of the channel member, and insulating members between the clamping plates and the adjacent capacitor sections.

HAMILTON BROOKS.